(12) United States Patent
Shimamura et al.

(10) Patent No.: US 6,653,019 B1
(45) Date of Patent: Nov. 25, 2003

(54) NON-AQUEOUS ELECTROLYTE SECONDARY CELL

(75) Inventors: Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,532

(22) PCT Filed: Apr. 18, 2000

(86) PCT No.: PCT/JP00/02502

§ 371 (c)(1), (2), (4) Date: Feb. 28, 2001

(87) PCT Pub. No.: WO00/63986

PCT Pub. Date: Oct. 26, 2000

Related U.S. Application Data

(63) Continuation-in-part of application No. 09/090,484, filed on Jun. 3, 1998, now Pat. No. 6,090,505.

(30) Foreign Application Priority Data

Apr. 20, 1999 (JP) ............................................. 11-112073
Apr. 20, 1999 (JP) ............................................. 11-112074

(51) Int. Cl.$^7$ ................................................. H01M 4/36
(52) U.S. Cl. ...................... 429/218.1; 429/209; 429/229
(58) Field of Search ............................ 429/209, 218.1, 429/229

(56) References Cited

U.S. PATENT DOCUMENTS 4,302,518 A 11/1981 Goodenough et al.

(List continued on next page.)

FOREIGN PATENT DOCUMENTS

EP 0693568 7/1994

(List continued on next page.)

OTHER PUBLICATIONS

Japanese search report for PCT/JP00/02502 dated Jul. 18, 2000.
K.M. Abraham et al., "Li$^+$–Conductive Solid Polymer Electrolytes with Liquid–Like Conductivity", Journal Electrochem. Society, vol. 137, No. 5, pp. 1657–1658 (1990).
J.R. MacCallum et al., "Polymer Electrolyte Reviews–2," 1989, pp. 229–305.
N. Ogata, "Conductive Polymer," 1990, pp. 95–109 (w/English translation).
A. Rogier et al.,"Effect of Cobalt Substitution on Cationic Distribution in LiNi$_{1-y}$Co$_y$O$_2$ Electrode Materials," *Solid State Ionics*, 90 (1996) pp. 83090.
M. Armand et al., "Polymeric Solid Electrolytes," Second Intl. Meeting on Solid Electrolytes (1978).

*Primary Examiner*—Carol Chaney
*Assistant Examiner*—Dah Wei Yuan
(74) *Attorney, Agent, or Firm*—RatnerPrestia

(57) ABSTRACT

A non-aqueous electrolyte secondary battery using composite particles for its negative electrode. In the composite particles, nucleus particles including at least one element selected from tin, silicon, and zinc as their constituent element are entirely or partly covered with a solid solution or inter-metallic compound of said constituent element and at least one element selected from groups consisting of Group 2 elements, transition elements, and Group 12, Group 13, and Group 14 elements in the Periodic Table except for the constituent element of the nucleus particles and carbon. Further, the present invention is characterized in that the NMR signals of the lithium intercalated in the composite particles appear within the range of −10 to 40 ppm with respect to lithium chloride and at least one signal appears within the range of −10 to 4 ppm.

2 Claims, 2 Drawing Sheets

U.S. PATENT DOCUMENTS

| | | | |
|---|---|---|---|
| 4,303,748 A | 12/1981 | Armand et al. | |
| 4,427,751 A | 1/1984 | Furukawa et al. | |
| 4,489,143 A | 12/1984 | Gilbert et al. | |
| 4,495,358 A | 1/1985 | Koyama et al. | |
| 4,632,889 A | 12/1986 | McManis et al. | |
| 4,950,566 A | 8/1990 | Huggins et al. | |
| 5,085,952 A | 2/1992 | North | |
| 5,160,712 A | 11/1992 | Thackeray et al. | |
| 5,223,353 A | 6/1993 | Ohsawa et al. | |
| 5,275,750 A | 1/1994 | Sato et al. | |
| 5,296,318 A | 3/1994 | Gozdz et al. | |
| 5,395,711 A | 3/1995 | Tahara et al. | |
| 5,460,903 A | 10/1995 | Hubbard et al. | |
| 5,536,600 A * | 7/1996 | Kaun | 429/221 |
| 5,587,256 A | 12/1996 | Wilson et al. | |
| 5,589,296 A | 12/1996 | Iwamoto et al. | |
| 5,624,606 A | 4/1997 | Wilson et al. | |
| 5,665,265 A | 9/1997 | Gies et al. | |
| 5,677,081 A | 10/1997 | Iwamoto et al. | |
| 5,770,333 A | 6/1998 | Saito et al. | |
| 5,824,434 A | 10/1998 | Kawakami et al. | |
| 5,827,331 A | 10/1998 | Block et al. | |
| 5,900,335 A | 5/1999 | Nishimura et al. | |
| 6,090,505 A * | 7/2000 | Shimamura et al. | 429/209 |

FOREIGN PATENT DOCUMENTS

| | | | | |
|---|---|---|---|---|
| EP | 0 730 316 | 9/1996 | | |
| EP | 0883199 | 12/1998 | | |
| JP | 63-274058 | 11/1988 | | |
| JP | 63-276873 | 11/1988 | | |
| JP | 3-14054 | 1/1991 | | |
| JP | 03-037964 | 2/1991 | | |
| JP | 4-95345 | 3/1992 | | |
| JP | 04-206479 | 7/1992 | | |
| JP | 4-242890 | 8/1992 | | |
| JP | 4-249073 | 9/1992 | | |
| JP | 4-267053 | 9/1992 | | |
| JP | 5-62712 | 3/1993 | | |
| JP | 05-234593 | 9/1993 | | |
| JP | 05-310418 | 11/1993 | | |
| JP | 6-36798 | 2/1994 | | |
| JP | 06-98473 | 4/1994 | | |
| JP | 6-103976 | 4/1994 | | |
| JP | 06-279049 | 10/1994 | | |
| JP | 07-240201 | 9/1995 | | |
| JP | 07-296854 | 11/1995 | | |
| JP | 7-315822 | 12/1995 | | |
| JP | 8-250117 | 9/1996 | | |
| JP | 09-063651 | 3/1997 | | |
| JP | 09-063651 | * | 7/1997 | H01M/10/40 |
| JP | 9-259857 | 10/1997 | | |
| JP | 10-3947 | 1/1998 | | |
| JP | 10-36120 | 2/1998 | | |
| JP | 10-92424 | 4/1998 | | |
| JP | 10-208741 | 8/1998 | | |
| JP | 10-257687 | 9/1998 | | |
| JP | 10-316426 | 12/1998 | | |
| JP | 10-321225 | 12/1998 | | |
| JP | 11-135120 | 5/1999 | | |
| JP | 11-185753 | 7/1999 | | |
| JP | 11-297311 | 10/1999 | | |
| JP | 2000030703 | 1/2000 | | |
| WO | WO 96/10538 | 4/1996 | | |
| WO | 98/07729 | 2/1998 | | |

* cited by examiner

Reference Numerals 1. battery case
2. sealing plate
3. insulating gasket
4. electrode plate group
5. positive electrode plate
5a. positive electrode lead
6. negative electrode
6a. negative electrode lead
7. separator
8. insulating ring

NON-AQUEOUS ELECTROLYTE SECONDARY CELL

CROSS REFERENCE TO RELATED APPLICATIONS

This application is a national phase of PCT/JP00/02502 filed on Apr. 8, 2000 which is a continuation-in-part of U.S. patent application Ser. No. 09/090,484, filed Jun. 3, 1998, now U.S. Pat. No. 6,090,505, issued Jul. 18, 2000.

FIELD OF THE INVENTION

The present invention relates to non-aqueous electrolyte secondary batteries, particularly to non-aqueous electrolyte secondary batteries (hereinafter referred to as "secondary batteries") with high energy density and improved electrochemical characteristics, such as charge/discharge capacity and cycle life, that are provided by the improved negative electrode material and non-aqueous electrolyte.

BACKGROUND OF THE INVENTION

High electromotive force and high energy density are featured by lithium secondary batteries recently used for such mobile communications equipment as personal digital assistants and mobile electronic apparatus , main power supply for the mobile electronic gears, small domestic power storage devices, and motor bicycles, electric vehicles, and hybrid cars using motors as their driving sources.

Lithium ion secondary batteries using organic electrolytic solutions, carbon materials as their negative electrode active materials, and lithium-containing composite oxides as their positive electrode active materials have higher energy density and more excellent low-temperature characteristics than secondary batteries using aqueous solutions. Moreover, without using lithium metals for their negative electrodes, lithium ion secondary batteries also have excellent cycle stability and safety, thus rapidly becoming commercially practical. Lithium polymer batteries using electrolytes like macromolecular (polymer) gel containing organic electrolytic solutions are also being developed as a new battery family of thin and light type.

When a lithium metal with high capacity is used as negative electrode material, dendrite-like deposition is formed on the negative electrode during charging. During repeated charge and discharge operations, the dendrite may penetrate the separator or polymer gel electrolyte, reach the positive electrode side and thus cause internal short circuits. Having a large specific surface area and thus high reactivity, the lithium deposition reacts with the solvent, becomes inactive, and decreases the charge/discharge efficiency. This phenomenon increases the internal resistance of the battery and produces particles isolated from electronic conduction network, thus decreasing the charge/discharge efficiency of the battery. For these reasons, lithium secondary batteries using lithium metals as their negative electrode materials have problems of having low reliability and poor cycle life characteristics.

At present, lithium secondary batteries use, for their negative electrodes, carbon materials capable of intercalating and de-intercalating lithium ions, and have become commercially available. Generally, since metal lithium does not deposit on a carbon negative electrode, it does not cause the problem of internal short circuits resulting from the production of dendrite. However, the theoretical capacity of graphite, one of carbon materials now in use, is 372 mAh/g, which is so small as one-tenth the theoretical capacity of pure Li metal.

As other negative electrode materials, metallic and non-metallic pure elements that form compounds with lithium are known. For example, the composition formula of a compound of tin (Sn), silicon (Si), or zinc (Zn) containing largest amount of lithium is expressed by $Li_{22}Sn_5$, $Li_{22}Si_5$, or $LiZn$, respectively. Within this composition range, generally, no metallic lithium deposits; therefore, there is no problem of internal short circuits caused by the formation of dendrite. The electrochemical capacities between these compounds and each of the pure elements are 993 mAh/g, 4,199 mAh/g, and 410 mAh/g, respectively, all of which are larger than that of graphite.

Other compounds for negative electrode materials proposed include a nonferrous metal silicide consisting of transition elements disclosed in Japanese Patent Laid-Open Publication No. H07-240201, and a negative electrode material consisting of an inter-metallic compound containing at least one element selected from Group 4B elements, P, and Sb and having a crystal structure of one of $CaF_2$, ZnS, or AlLiSi type disclosed in Japanese Patent Laid-Open Publication No.H09-63651.

However, each of the aforementioned negative electrode materials with high capacity has the following problems.

Generally, the negative electrode materials of metallic and non-metallic pure elements that form compounds with lithium exhibit poorer charge/discharge cycle characteristics than carbon negative electrode materials. This is probably because the negative electrode materials break by their volumetric expansion and shrinkage.

Meanwhile, unlike the aforementioned pure elements, a negative electrode material that consists of a nonferrous metal silicide consisting of transition elements and an inter-metallic compound that contains at least one element selected from Group 4B elements, P, and Sb and has a crystal structure of one of $CaF_2$, ZnS, or AlLiSi type are proposed as negative electrode materials with improved cycle life characteristics in Japanese Patent Laid-Open Publication No.H07-240201 and No.H09-63651, respectively. In Japanese Patent laid-Open Publication No.H10-208741, the range of nuclear magnetic resonance (hereinafter abbreviated as NMR) signals of lithium intercalated in the negative electrode material is proposed.

In the battery using the nonferrous metal silicide consisting of transition elements as the negative electrode material disclosed in Japanese Patent Laid-Open Publication No.H07-240201, while the discharge capacities at the first, fiftieth and hundredth cycles shown in its examples and a comparative example indicate that its charge/discharge cycle characteristics have been more improved than those of the lithium metal negative electrode material , the discharge capacities have only increased by about 12% at maximum compared with that of the natural graphite negative electrode material.

For the material disclosed in Japanese Patent Laid-Open Publication No.H09-63651, its examples and comparative examples show that it has more improved charge/discharge cycle characteristics than the negative electrode material of Li—Pb alloy and has higher discharge capacity than graphite. However, the battery considerably decreases its discharge capacity at 10 to 20 charge/discharge cycles and even with $Mg_2Sn$ that is considered best, its capacity decreases to 70% of its initial capacity after about 20 cycles. For this reason, this material is inferior in charge/discharge characteristics.

For the material disclosed in Japanese Patent Laid-Open Publication No. H10-208741, NMR signals of the lithium intercalated in various alloys appear within the range of 5 to 40 ppm. By using this material, an electrode material with high energy density and excellent cycle life is proposed. However, as for the cycle life of the battery using this electrode material, its capacity decreases to 70% of its maximum after 372 cycles even when LiCoO2 is used for its positive electrode.

The present invention addresses the aforementioned problems conventional batteries have.

SUMMARY OF THE INVENTION

The negative electrode of the battery of the present invention is characterized by the use of composite particles. In the composite particles, nucleus particles containing at least one element selected from tin, silicon, and zinc as their primary constituent element are covered with a solid solution or inter-metallic compound of the elements constituting the nucleus particles and at least one element selected from groups consisting of Group 2 elements, transition elements, and Group 12, Group 13, and Group 14 elements in the Periodic Table except for carbon and constituent element of the nucleus particles. Further, the negative electrode of the battery of the present invention is characterized in that NMR signals of the lithium intercalated in the negative electrode material appear within the range of −10 to 40 ppm with respect to lithium chloride as a reference and at least one NMR signal appears within the range of −10 to 4 ppm. In addition, the negative electrode of the battery of the present invention is characterized in that the above NMR signals with respect to lithium chloride as a reference appear within the range of −10 to 4 ppm and −10 to 20 ppm and the NMR signal intensity appearing within the range of −10 to 4 ppm is 1 to 10 times as large as those appearing within the range of 10 to 20 ppm.

With the aforementioned structure, non-aqueous electrolyte secondary batteries that address the problems of conventional batteries and have higher energy density and more excellent cycle characteristics can be provided.

PREFERRED EMBODIMENTS OF THE INVENTION

Figure 1:
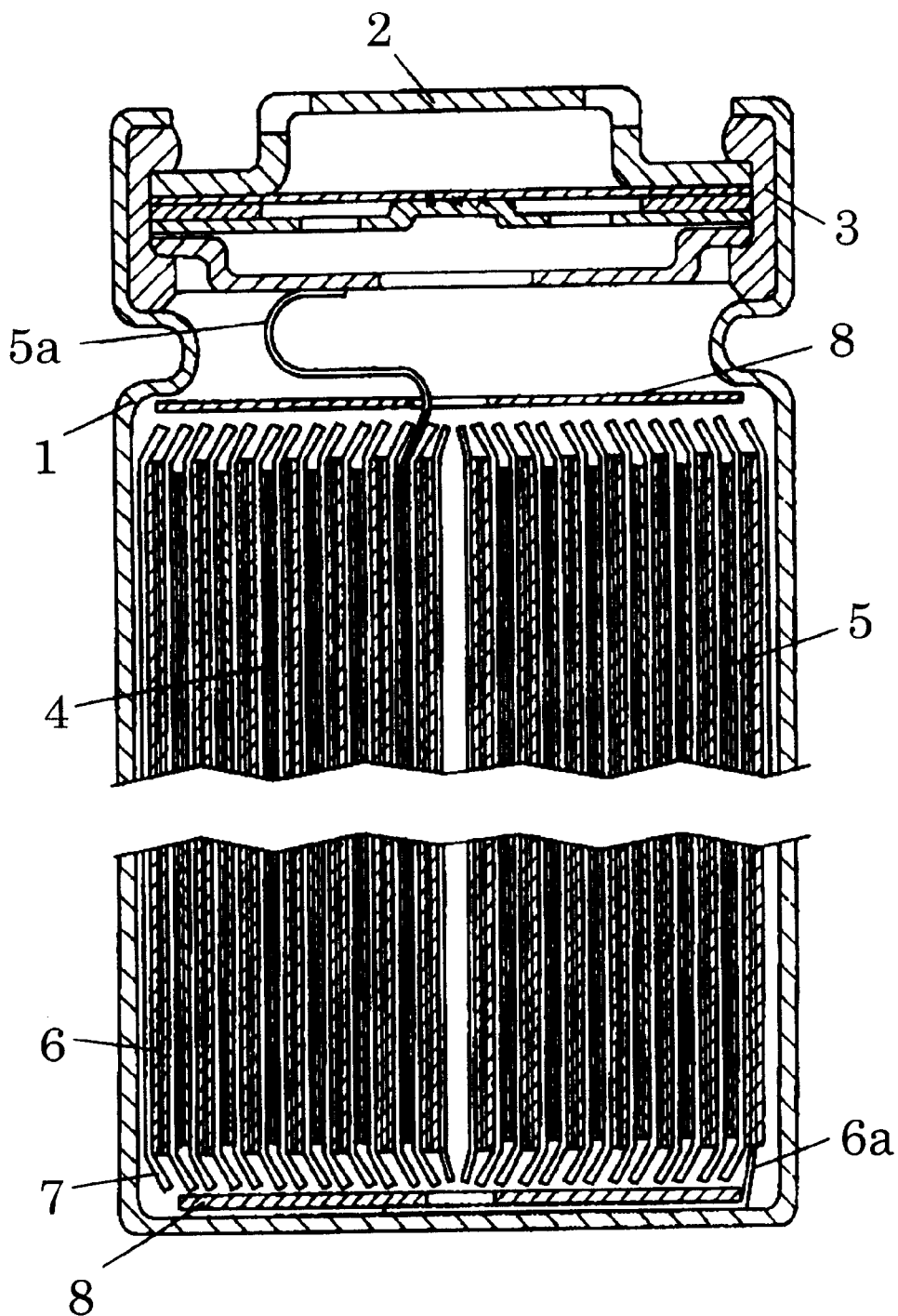
FIG. 1 is a longitudinal section of a cylindrical battery of the present invention.

The battery of the present invention has positive and negative electrodes capable of intercalating and de-intercalating lithium, a non-aqueous electrolytic solution and a separator or a solid electrolyte.

The negative electrode material of the present invention uses composite particles in which nucleus particles comprising solid phase A are entirely or partly covered with solid phase B.

Solid phase A includes of at least one element selected from tin, silicon, and zinc.

Solid phase B includes a solid solution or an inter-metallic compound of at least one element selected from tin, silicon, and zinc and the other elements. The other elements constituting solid phase B comprise at least one element selected from groups consisting of Group 2 elements, transition elements, and Group 12, Group 13, and Group 14 elements in the periodic table except for the above constituent element and carbon.

In the following, the above negative electrode material of the present invention is referred to as "composite particles".

By using the above composite particles as negative electrode material, solid phase B inhibits the expansion and shrinkage caused by charge and discharge of solid phase A, and thus the negative electrode material with excellent charge/discharge cycle characteristics can be obtained.

In the negative electrode material of the present invention, solid phase A is considered to mainly contribute to increase charge/discharge capacity because it contains at least one element selected from tin, silicon, and zinc that have high capacity. Solid phase B entirely or partly covering the nucleus particles consisting of solid phase A contributes to the improvement in charge/discharge cycle characteristics. The amount of lithium contained in solid phase B is generally smaller than that contained in the pure metal, solid solution, or inter-metallic compound.

In other words, the negative electrode material used in the present invention is made of nucleus particles comprising at least one element selected from tin, silicon, and zinc that provide high capacity, and a solid solution or inter-metallic compound that is unlikely to pulverize and covers the nucleus particles. The solid solution or inter-metallic compound of the covering layer can restrain a change in the crystal structure of the nucleus particles, i.e. a large volumetric change, thus inhibiting the pulverization of the nucleus particles.

When the negative electrode materials react with lithium, lithium exists in the composite particles with covalent bonds or as ions. The NMR signals of covalent bonded $^7Li$ appear within the range of 10 to 20 ppm. The site in which covalent bonded lithium exists is hereinafter referred to as "X site". The NMR signals of $^7Li$ ions appear within the range of −10 and 40 ppm. The site in which lithium ion exists is hereinafter referred to as "Y site".

The Y site partly includes the signals related to irreversible factors. Such signals are generally found for negative electrodes of carbon materials, and seldom found for those of the present invention.

As described above, when a large amount of reversible X and Y sites of lithium exist, high capacity and excellent cycle characteristics can be obtained. In other words, appearance of the NMR signals of $^7Li$ within the range of −10 to 40 ppm and −10 to 4 ppm at the same time in a charged state show the existence of both X and Y sites. It was found that high capacity and excellent cycle characteristics can be attained in such a state.

Moreover, it was found that higher capacity and more excellent cycle characteristics can be attained when the strength of signals appearing within the range of −10 to 4 ppm indicating the existence of the Y site are 1 to 10 times as large as those of the signals appearing within the range of 10 to 20 ppm indicating the existence of the X site.

As described above, the present invention discriminates how lithium has been intercalated in the negative electrode material, i.e. as ions or covalent bonded, and determines the existence ratio using the NMR signals of $^7Li$ to provide the material with high capacity and excellent cycle characteristics.

In other words, in order to exhibit high capacity and excellent cycle characteristics, the NMR signals of $^7Li$ of the negative electrode material should appear within the range of −10 to 40 ppm and −10 to 4 ppm in a charged state.

The NMR signals of $^7Li$ appearing within the range of −10 to 40 ppm shows the existence of $^7Li$ ions and covalent bonded $^7Li$ mixed. The NMR signals of $^7Li$ appearing within the range of −10 and 4 ppm shows the existence of lithium ions that provides high capacity. Moreover, when the signals appearing within the range of −10 to 4 ppm that indicates the existence of lithium ions are 1 to 10 times as large as those appearing within the range of 10 to, 20 ppm that indicates the existence of covalent bonded lithium, much higher capacity can be attained.

The positive and negative electrodes used for the present invention are made by applying the surface of a current collector with a layer of an electrode mixture. The mixture contains positive electrode active materials or the above negative electrode materials capable of electrochemically and reversibly intercalating and de-intercalating lithium ions together with a conductive material, binder, and the like.

Next, producing methods of composite particles used as the negative electrode materials are described.

One method of producing composite particles includes:
quenching and solidifying the melt containing each element constituting the composite particles in the composition ratios, using dry atomization, wet atomization, roll quenching, rotating electrode method, and other methods; and
heat-treating the solidified material at a temperature lower than the solid line temperature of the solid solution or inter-metallic compound. The solid line temperature is determined by the composition ratio.

Quenching and solidifying the melt allows particles of solid phase A to deposit as the nucleus of the particles and solid phase B to deposit so as to entirely or partly cover the particles of solid phase A. Thereafter, heat treatment can improve the homogeneity of each of the solid phases A and B. Even when the above heat treatment is not performed, composite particles appropriate for the present invention can be obtained. Another cooling method can be used on condition that it can sufficiently cool the melt at a high speed.

Another production method is forming an layer comprising elements required for forming solid phase B over the surfaces of the powder of solid phase A, and heat-treating it at a temperature lower than the solid line temperature. This heat treatment allows component elements in solid phase A to diffuse toward the layer and to form solid phase B as a covering layer. The layer is formed using plating, mechanical alloying, or other method. The mechanical alloying method does not require heat treatment. Any method capable of forming the layer can be used.

Conductive materials for the negative electrodes can be any electronic conductive materials. Examples of such materials include: graphite materials including natural graphite (scale-like graphite), artificial graphite, and expanded graphite; carbon black materials such as acetylene black, high-structure carbon black typified by Ketzen black, channel black, furnace black, lamp black and thermal black; conductive fibers such as carbon fibers and metal fibers; metal powders such as copper and nickel; and organic conductive materials such as polyphenylene derivatives. These materials can be used independently or in combination. Among these conductive materials, artificial graphite, acetylene black, and carbon fibers are especially preferable.

The amount of conductive materials to be added is not specifically defined; however, 1 to 50 wt %, especially 1 to 30 wt %, of the negative electrode material is preferable. Having electronic conductivity in itself, the negative electrode material of the present invention (composite particles) can work as a battery electrode material without any additional conductive materials. Thus, more composite particles can be included in the electrode by the amount of conductive materials.

For binders for the negative electrodes, both thermoplastic resin and thermosetting resin can be used. Preferable binders for the present invention include the following materials: polyethylene, polypropylene, polytetrafluoroethylene (PTFE), polyvinylidene fluoride (PVDF), styrene-butadiene rubber, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, a ethylene-tetrafluoroethylene copolymer (ETFE resin), poly chlorotrifluoroethylene (PCTFE), a vinylidene fluoride-pentafluoropropylene copolymer, a propylene-tetrafluoroethylene copolymer, a ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, an ethylene-methyl acrylate copolymer or its Na+ ion crosslinking body, and an ethylene-methyl methacrylate copolymer or its Na+ ion crosslinking body. These materials can be used independently or in combination. Preferable materials among these materials are styrene-butadiene rubber, polyvinylidene fluoride, an ethylene-acrylic acid copolymer or its Na+ ion crosslinking body, an ethylene-methacrylic acid copolymer or its Na+ ion crosslinking body, an ethylene-methyl acrylate copolymer or its Na+ ion crosslinking body, and an ethylene-methyl methacrylate copolymer or its Na+ ion crosslinking body.

For current collectors for the negative electrodes, any electronic conductive material can be used on condition that it does not chemically change in the battery constructed. Examples of such materials include stainless steel, nickel, copper, titanium, carbon, and conductive resin as well as copper or stainless steel surface-treated with carbon, nickel, or titanium. Among these, copper and copper alloys are especially preferable. These materials can also be used after their surfaces have been oxidized. Desirably, the current collector is surface-treated to have roughened surface. The shapes of the current collector include a film, sheet, net, punched sheet, lath, porous body, foam, and formed and grouped fibers as well as a foil. The thickness is not specifically defined; however, collectors 1 to 500 µm thick are used.

As positive electrode active materials, compounds containing lithium or containing no lithium can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (M is at least one of Na, Mg, Sc, Y, Mn, Fe, Co, Ni, Cu, Zn, Al, Cr, Pb, Sb and B, where x=0–1.2, Y=0–0.9, z=2.0–2.3). The above value x is the value before charging and discharging; thus it changes along with charging and discharging. Other usable positive electrode materials include transition metal chalcogenides, a vanadium oxide and its lithium compounds, a niobium oxide and its lithium compounds, a conjugate polymer using organic conductive materials, and several phase compounds. It is also possible to use a plurality of different positive electrode materials in combination. The average diameter of particles of the positive electrode active materials is not specifically defined; however, desirably it is 1–30 µm.

Conductive materials for the positive electrode can be any electronic conductive material on condition that it does not chemically change within the range of charge and discharge electric potentials of the positive electrode materials in use. Examples of such materials include : graphite materials including natural graphite (scale-like graphite) and artificial graphite; carbon black materials such as acetylene black, high-structure carbon black typified by Ketzen black, channel black, furnace black, lamp black and thermal black; conductive fibers such as carbon fibers and metal fibers; metal powders such as fluorinated carbon and aluminum; conductive whiskers such as a zinc oxide and potassium titanate; conductive metal oxides such as a titanium oxide; and organic conductive materials such as polyphenylene derivatives. These materials can be used independently or in combination. Among these conductive materials, artificial graphite and acetylene black are especially preferable. The amount of conductive materials to be added is not specifically defined; however, 1 to 50 wt %, especially 1 to 30 wt %, of the positive electrode material is preferable. For carbon and graphite, 2 to 15 wt % is especially preferable.

For binders for the positive electrodes, both thermoplastic and thermosetting resins can be used. The aforementioned binders for the negative electrodes can preferably be used, and more preferable materials are PVDF and PTFE.

For current collectors for the positive electrodes, any electronic conductive material can be used on condition that it does not chemically change within electric potentials in the range of charge and discharge of the positive electrode material in use. For example, the aforementioned current collectors for the negative electrode can preferably be used. The thickness is not specifically defined; however, collectors 1 to 500 µm thick are used.

The electrode mixtures for the negative and positive electrode plates, can include filler, dispersant, ion conductor, pressure intensifier and other various additives as well as a conductive material and binder. As the filler, any fibrous material that does not chemically change in the constructed battery can be used. Generally, olefinic polymers such as polypropylene and polyethylene and such fibers as glass fibers and carbon fibers are used. The amount of the filler to be added is not specifically defined; however, 0 to 30 wt % of the electrode mixture is preferable.

Preferably, the negative and positive electrodes are structured so that at least the surface made of the negative electrode mixture is opposite the surface made of the positive electrode mixture.

The non-aqueous electrolytes used for the present invention are composed of non-aqueous solvents and lithium salts dissolved in the solvents. Examples of such non-aqueous solvents include: cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; γ-lactones such as γ-butyrolactone; acyclic ethers such as 1,2-dimethoxy ethane (DME), 1,2-diethoxy ethane (DEE), and ethoxy methoxy ethane (EME); cyclic ethers such as tetrahydrofuran and 2-methyl tetrahydrofuran; and non-protonic organic solvents such as dimethyl sulfoxide, 1,3-dioxolane, formamide, acetamide, dimethylformamide, dioxolane, acetonitrile, propylnitrile, nitromethane, ethyl monoglime, triester of phosphoric acid , trimethoxy methane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane saltane, anisole, dimethyl sulfoxide and N-methylpyrolidon. These solvents are used independently or as a mixture of one, two or more solvents. Among these, mixtures of cyclic carbonate and acyclic carbonate, or mixtures of cyclic carbonate, acyclic carbonate and aliphatic carboxylate are especially preferable.

Lithium salts dissolved into the above solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salt of lower aliphatic carboxylic acid, LiCl, LiBr, LiI, chloroboron lithium, 4-phenil boric acid, and an imide group. These lithium salts can be dissolved in the above non-aqueous solvents individually or in combination of two or more lithium salts to use as an electrolytic solution. It is especially preferable to include $LiPF_6$ in the electrolytic solution.

Especially preferable non-aqueous electrolytes of the present invention includes at least EC and EMC, and as a supporting salt, $LiPF_6$. The amount of the electrolyte to be added to the battery is not specifically defined. Considering the amount of the positive and negative electrode materials and the size of the battery, the required amount is used. The amount of the supporting electrolytes against the non-aqueous solvents is not specifically defined; however, 0.2 to 2 mol/l is preferable, and especially 0.5 to 1.5 mol/l is more preferable.

Besides the electrolytic solutions, the following solid electrolytes can also be used. The solid electrolytes are classified into inorganic and organic ones.

Well known inorganic solid electrolytes are lithium nitrides, lithium halides, and lithium oxides, and the like. Among them, $Li_4SiO_4$, $Li_4SiO_4$—LiI—LiOH, $xLi_3PO_4$—$(1-x)Li_4SiO_4$, $Li_2SiS_3$, $Li_3PO_4$—$Li_2S$—$SiS_2$ and phosphorus sulfide compounds can be used effectively.

As the organic solid electrolytes, polymer materials such as polyethylene oxides, polypropylene oxides, polyphosphazene, polyaziridine, polyethylene sulfides, polyvinyl alcohol, polyvinylidene fluorides, polyhexafluoropropylene and their derivatives, mixtures and complexes can effectively be used.

Moreover, it is effective to add other compounds to the electrolytic solution in order to improve discharge and charge/discharge characteristics. Such compounds include triethyl phosphite, triethanolamine, cyclic ethers, ethylene diamine, n-glime, pyridine, triamide hexaphosphate, nitrobenzene derivatives, crown ethers, quaternary ammonium salts, and ethylene glycol dialkyl ether.

As separators, insulating micro-porous thin film having large ion permeability and predetermined mechanical strength is used. Desirably, these separators have functions of closing their pores and increasing resistance above predetermined temperatures. In terms of resistance to organic solvents and hydrophobic properties, olefinic polymers such as polypropylene and polyethylene are used independently or in combination, or sheets and woven or non-woven fabrics made of glass fibers, and the like, are used. Desirably, the micro-porous separator has pores of a diameter that does not allow the positive or negative electrode material, binder, and conductive material liberated from the electrode sheets to pass. For example, pores 0.01 to 1 µm in diameter are preferable. Generally, separators 10 to 300 µm thick are used. The porosity of the separator is determined according to the permeability of electrons and ions, materials, and thickness. Generally, a porosity of 30 to 80% is desirable.

A battery with integrated porous separator and positive and negative electrodes can be constructed. The integrated positive and negative electrode mixtures contain a polymer material that absorbs and holds an organic electrolytic solution composed of a solvent and a lithium salt dissolved in the solvent. The separator is composed of a polymer absorbing and holding the organic electrolytic solution. In this case, any polymer material capable of absorbing and holding the organic electrolytic solution can be used.

Especially, a vinylidene fluoride—hexafluoropropylene copolymer is preferable.

The battery can be of any shape including a coin, button, sheet, lamination, cylinder, flat, square, and a large type used for an electric vehicle.

The materials used for the batteries of the present invention are hereinafter described in detail. However, the present invention is not limited to these examples.

The positive and negative electrodes used for the batteries of the present invention are made of current collectors coated with the mixtures. The mixtures are essentially include positive electrode active material and negative electrode material capable of electrochemically and reversibly intercalating and de-intercalating lithium ions, and conductive materials and binder.

Production of Composite Particles

Table 1 shows the composition of solid phases A and B of the composite particles (single element, inter-metallic compound, and solid solution) used for the examples of the present invention, ratios of the elements at preparation, fusing temperatures, and solid line temperatures.

Powder or a block of each element constituting composite particles was put into a crucible in the composition ratio shown in Table 1. The material was fused at a temperature shown in Table 1 and quenched using the roll quenching method and solidified to obtain a solidified material. Sequentially, the solidified material was heat-treated in an inert atmosphere at a temperature about 10 to 50° C. lower than the solid line temperature shown in Table 1 for 20 hours. The heat-treated material was pulverized with a ball mill and classified with a sieve to obtain composite particles 45 μm or smaller in size. Electron microscope observations verified that these particles were made of particles of solid phase A entirely or partly covered with particles of solid phase B.

The structure of the batteries of the present invention is described with reference to specific examples of a cylindrical battery.

EXAMPLE 1

FIG. 1 shows a longitudinal section of the cylindrical battery of the present invention. Positive electrode plate 5 and negative electrode plate 6 are spirally wound via separator 6 and housed in battery case 1. Positive electrode lead 5a is led out from the positive electrode plate 5 and connected to sealing plate 2. Negative electrode lead 6a is led out from negative electrode plate 6 and connected to the bottom of battery case 1.

Metals and alloys having electronic conductivity and resistance to organic electrolytic solutions can be used for the battery case and lead plate. For example, metals such as iron, nickel, titanium, chromium, molybdenum, copper, and aluminum, and their alloys are used. Stainless steel plates or processed Al—Mn alloy plates are especially preferable materials for the battery case, aluminum for the positive electrode lead, and nickel for the negative electrode lead. For the battery case, various kinds of engineering plastics and those in combination with metals can be used to reduce its weight.

Insulating rings 8 are provided on the top and bottom of grouped electrode plates 4, respectively. The sealing plate can be used as a safety valve. Conventionally known various safety elements can be installed other than the safety valve. Such safety elements include a fuse, bimetal, and PTC device functioning as an overcurrent protection device.

Other than the safety valve, notching the battery case, cracking the gasket, cracking the sealing plate, or breaking connection with the lead can also be used to prevent an increase in internal pressure of the battery case. A protection circuit capable of protecting from overcharge or overdischarge can be incorporated in a battery charger or provided independently. In addition, a system in which an increase in the internal pressure of the battery case breaks the current can be incorporated to eliminate overcharge. In this case, compounds capable of increasing the internal pressure can be contained in the electrode mixtures or electrolytes. Such compounds include carbonates such as $Li_2CO_3$, $LiHCO_3$, $Na_2CO_3$, $NaHCO_3$, $CaCO3$, and $MgCO_3$.

For welding the cap, battery case, sheet and lead, well-known methods (e.g. electric welding using direct or alternating current, laser welding, and ultrasonic welding) can be used. As the sealing materials for sealing the openings, conventionally known compounds and mixtures, such as asphalt, can be used.

Negative electrode plate 6 was made by:
  mixing 20 wt % of carbon powder, 5 wt % of PVDF and 75 wt % of composite particles synthesized under the above conditions;
  dispersing the mixture in dehydrated N-methyl pyrrolidinone to prepare a slurry;
  coating the negative electrode current collector made of a copper foil with the slurry; and
  drying and then rolling it.

Positive electrode plate 5 was made by:
  mixing 10 wt % of carbon powder, 5 wt % of PVDF and 85 wt % of lithium cobaltate powder;
  dispersing the mixture in dehydrated N-methylpyrrolidinone to prepare a slurry;
  coating the positive electrode current collector made of a copper foil with the slurry; and
  drying and then rolling it.

An electrolytic solution containing 1.5 mol/l of $LiPF_6$ dissolved in a mixed solvent of EC and EMC in a volumetric ratio of EC:EMC=1:1 was used.

Thus, the batteries were made using the materials shown in Table 1 for their negative electrodes. The cylindrical batteries produced are 18 mm in diameter and 65 mm in height.

Comparative Example 1

A battery using graphite for its negative electrode was produced in the same manner as Example 1 for comparison.

After these batteries were charged at a constant current of 100 mA, they were discharged at a constant current of 100 mA to 2.0 V. Such charge/discharge cycles were repeated in an oven at a constant temperature of 20° C. The charge/discharge cycles were repeated up to 400 times and the ratio of the discharge capacity at the 400th cycle to the initial discharge capacity was shown as a capacity retention rate in Table 2.

In addition, NMR measurement was performed on the $^7Li$ of the negative electrode materials in a charged state and the NMR signals of the intercalated lithium were measured with respect to the lithium chloride as a reference. Several NMR signals appeared within the range of −10 to 40 ppm. FIG. 2 shows the positions at which the signals appeared and the signal intensity ratio of the NMR signals appearing within the range of −10 to 4 ppm to those appearing within the range of 10 to 20 ppm. Due to variations from lot to lot, the same material exhibited different signal positions and intensities. The NMR measuring conditions of the $^7Li$ are as follows:

Instrument: INOVA 400 (VARIAN Co.)
Temperature: room temperature
Measured nuclear: $^7$Li
Revolution of the samples: 10 kHz
Reference Material: LiCl 1M Table 2 shows the followings about batteries A to S using materials A to S as negative electrode materials.

Even when the NMR signals of $^7$Li intercalated in the negative electrode materials appear within the range of −10 to 40 ppm, (1) in the case where no signals appear within the range of −10 to 4 ppm and (2) in the case where all the signals appear in the magnetic field lower than 4 ppm, the capacity retention rates after 400 cycles are high; however, the initial capacities and the capacities after 400 cycles are lower than those of battery T using the graphite negative electrode.

In the case where the signals appear between the magnetic fields lower than 5 ppm and higher than −10 ppm, the initial capacities are large but the capacity retention rates after 400 cycles are small and the discharge capacities after 400 cycles are smaller than that of battery T.

Meanwhile, when the signals appear within the range of −10 to 40 ppm and at least one signal appears within the range of −10 to 4 ppm, the initial capacities are larger than that of battery T and the capacity retention rates after 400 cycles are 70% or higher and the capacities after the cycles are larger than that of battery T.

When the signal strength of the signals appearing within the range of −10 to 4 ppm indicating the $^7$Li mainly in the ionic state is 1 to 10 times as large as the signal strength of the signals appearing within the range of 10 to 20 ppm indicating the $^7$Li mainly covalent bonded, the capacities after 400 cycles are the largest.

As mentioned above, when the NMR signals of lithium intercalated in the negative electrode materials appear within the range of −10 to 40 ppm with respect to lithium chloride as a reference and at least one NMR signal appears within the range of −10 to 4 ppm, a secondary battery with high capacity and excellent cycle characteristics can be obtained. Moreover, when the NMR signals of the lithium intercalated in the negative electrode materials appearing within the range of −10 to 4 ppm are 1 to 10 times as large as those appearing within the range of 10 to 20 ppm, a secondary battery with higher capacity and more excellent cycle characteristics can be obtained.

Regarding the elements constituting negative electrode materials, when solid phase A is made of tin, Mg selected from Group 2 elements, Fe and Mo from transition elements, Zn and Cd from Group 12 elements, In from Group 13 elements, and Pb from Group 14 elements are used. However, using other elements in each Group could provide similar results. Solid phase A may include any element other than tin, including a trace amount of such elements as O, C, N, S, Ca, Mg, Al, Fe, W, V, Ti, Cu, Cr, Co, and P.

Regarding the elements constituting negative electrode materials, when solid phase A is made of silicon, Mg selected from Group 2 elements, Co and Ni from transition elements, Zn from Group 12 elements, Al from Group 13 elements, and Sn from Group 14 elements are used. However, using other elements in each Group can provide similar results.

In addition, when solid phase A is made of zinc, Mg selected from Group 2 elements, Cu and V from transition elements, Cd from Group 12 elements, Al from Group 13 elements, and Ge from Group 14 elements are used. However, using other elements in each Group can provide similar results.

The composition ratios of the elements constituting the negative electrode materials are not specifically defined. Any composition can be used on condition that the elements provide two phases so that one phase (solid phase A) essentially consists of tin, silicon, and zinc, and the other phase (solid phase B) entirely or partly covers the surface of solid phase A. Solid phase A may contain any element except each constituent element, for example, a trace amount of such elements as O, C, N, S, Ca, Mg, Al, Fe, W, V, Ti, Cu, Cr, Co, and P.

As described above, a non-aqueous electrolyte secondary battery having, higher capacity and more excellent cycle characteristics than conventional ones using carbon materials for their negative electrodes can be obtained, when the battery uses aforementioned composite particles composed of nucleus particles of solid phase A and solid phase B entirely or partly covering the solid phase A, and NMR signals of the lithium intercalated in the negative electrode material appear within the range of −10 to 40 ppm with respect to lithium chloride as a reference and at least one signal appears within the range of −10 to 4 ppm. Moreover, a non-aqueous electrolyte secondary battery with higher capacity and more excellent cycle characteristics than conventional ones using carbon materials for their negative electrodes can be obtained when the NMR signals of the lithium intercalated in the negative electrode material appearing within the range of −10 to 4 ppm with respect to lithium chloride as a reference is 1 to 10 times as large as those appearing within the range of 10 to 20 ppm.

INDUSTRIAL APPLICABILITY

The secondary battery using the composite particles for the negative electrode in accordance with the present invention has higher energy density and more effects on the improvement in charge/discharge cycle life characteristics than the conventional batteries using carbon materials for their negative electrodes. For this reason, the secondary battery of the present invention can be used for personal digital assistants, mobile electronic equipment, small domestic power storage devices, motor bicycles, electric vehicles, hybrid cars, and the like, thus providing great industrial effects. The uses of the secondary battery of the present invention are not limited to those described above, and can be used for any application requiring a secondary battery.

TABLE 1

| Negative electrode material | Solid phase A | Solid phase B | Fusing temperature (° C.) | Solid line temperature (° C.) | Composition ratio (atomic %) |
|---|---|---|---|---|---|
| Material A | Sn | Mg$_2$Sn | 770 | 204 | Sn:Mg = 50:50 |
| Material B | Sn | FeSn$_2$ | 1540 | 513 | Sn:Fe = 70:30 |
| Material C | Sn | MoSn$_2$ | 1200 | 800 | Sn:Mo = 70:30 |
| Material D | Sn | Solid solution of Zn and Sn | 420 | 199 | Sn:Zn = 90:10 |
| Material E | Sn | Solid solution of Cd and Sn | 232 | 133 | Sn:Cd = 95:5 |
| Material F | Sn | Solid solution of In and Sn | 235 | 224 | Sn:In = 98:2 |
| Material G | Sn | Solid solution of Sn and Pb | 232 | 183 | Sn:Pb = 80:20 |
| Material H | Si | Mg$_2$Si | 1415 | 946 | Si:Mg = 70:30 |

TABLE 1-continued

| Negative electrode material | Solid phase A | Solid phase B | Fusing temperature (° C.) | Solid line temperature (° C.) | Composition ratio (atomic %) |
|---|---|---|---|---|---|
| Material I | Si | CoSi$_2$ | 1495 | 1256 | Si:Co = 85:15 |
| Material J | Si | NiSi$_2$ | 1415 | 993 | Si:Ni = 69:31 |
| Material K | Si | Solid solution of Si and Zn | 1415 | 420 | Si:Zn = 50:50 |
| Material L | Si | Solid solution of Si and Al | 1415 | 577 | Si:Al = 40:60 |
| Material M | Si | Solid solution of Si and Sn | 1415 | 232 | Si:Sn = 50:50 |
| Material N | Zn | Mg$_2$Zn$_{11}$ | 650 | 364 | Zn:Mg = 92.9:7.8 |
| Material O | Zn | Solid solution of Zn and Cu | 1085 | 425 | Zn:Cu = 97:3 |
| Material P | Zn | VZn$_{11}$ | 700 | 420 | Zn:V = 94:6 |
| Material Q | Zn | Solid solution of Zn and Cd | 420 | 266 | Zn:Cd = 50:50 |
| Material R | Zn | Solid solution of Zn and Al | 661 | 381 | Zn:Al = 90:10 |
| Material S | Zn | Solid solution of Zn and Ge | 938 | 394 | Zn:Ge = 97:3 |

TABLE 2

| Battery | Electrode material | Charging voltage (V) | NMR signal positions (ppm) | Strength ratio* (times) | Initial discharge capacity (mAH) | Discharge capacity after 400th cycle (mAH) | Capacity retention rate (%) |
|---|---|---|---|---|---|---|---|
| A | Material A | 4.0 | 8, 13 | 0.5 | 1081 | 864 | 80 |
| | | 4.05 | 4, 13 | 0.8 | 1332 | 1038 | 78 |
| | | 4.1 | −4, 13 | 1 | 1566 | 1205 | 77 |
| | | 4.15 | −6, 13 | 10 | 1633 | 1208 | 74 |
| | | 4.18 | −10, 13 | 12 | 1659 | 1161 | 70 |
| | | 4.2 | −12, 13 | 15 | 1766 | 512 | 29 |
| B | Material B | 4.0 | 7, 13 | 0.4 | 1077 | 872 | 81 |
| | | 4.05 | 4, 13 | 0.9 | 1473 | 1148 | 78 |
| | | 4.1 | −2, 13 | 1 | 1789 | 1359 | 76 |
| | | 4.15 | −5, 13 | 10 | 1849 | 1386 | 75 |
| | | 4.18 | −10, 13 | 12 | 1855 | 1298 | 70 |
| | | 4.2 | −13, 13 | 15 | 1898 | 284 | 15 |
| C | Material C | 4.0 | 6, 13 | 0.5 | 1067 | 853 | 80 |
| | | 4.05 | 3, 13 | 0.7 | 1600 | 1248 | 78 |
| | | 4.1 | −5, 13 | 2 | 1825 | 1350 | 74 |
| | | 4.15 | −6, 13 | 10 | 1834 | 1338 | 73 |
| | | 4.18 | −10, 13 | 12 | 1847 | 1292 | 70 |
| | | 4.2 | −11, 13 | 14 | 1859 | 390 | 21 |
| D | Material D | 4.0 | 6, 13 | 0.5 | 1047 | 827 | 79 |
| | | 4.05 | 4, 13 | 0.8 | 1578 | 1230 | 78 |
| | | 4.1 | −4, 13 | 1 | 1829 | 1371 | 75 |
| | | 4.15 | −4, 13 | 8 | 1839 | 1360 | 74 |
| | | 4.18 | −10, 13 | 12 | 1852 | 1296 | 70 |
| | | 4.2 | −12, 13 | 15 | 1877 | 356 | 19 |
| E | Material E | 4.0 | 8, 13 | 0.5 | 1001 | 800 | 80 |
| | | 4.05 | 4, 13 | 0.8 | 1613 | 1258 | 78 |
| | | 4.1 | −4, 13 | 1 | 1861 | 1414 | 76 |
| | | 4.15 | −5, 13 | 10 | 1874 | 1386 | 74 |
| | | 4.18 | −10, 13 | 11 | 1876 | 1313 | 70 |
| | | 4.2 | −11, 13 | 12 | 1899 | 338 | 21 |
| F | Material F | 4.0 | 8, 13 | 0.5 | 1073 | 879 | 82 |
| | | 4.05 | 4, 13 | 0.8 | 1623 | 1265 | 78 |
| | | 4.1 | −4, 13 | 1 | 1846 | 1420 | 77 |
| | | 4.15 | −6, 13 | 10 | 1852 | 1389 | 75 |
| | | 4.18 | −9, 13 | 11 | 1861 | 1302 | 70 |
| | | 4.2 | −12, 13 | 12 | 1888 | 339 | 18 |
| G | Material G | 4.0 | 6, 13 | 0.5 | 1054 | 832 | 79 |
| | | 4.05 | 4, 13 | 0.8 | 1572 | 1227 | 78 |
| | | 4.1 | −3, 13 | 1.5 | 1833 | 1411 | 77 |
| | | 4.15 | −4, 13 | 10 | 1848 | 1404 | 76 |
| | | 4.18 | −10, 13 | 12 | 1855 | 1317 | 71 |
| | | 4.2 | −11, 13 | 15 | 1899 | 474 | 25 |

TABLE 2-continued

| Battery | Electrode material | Charging voltage (V) | NMR signal positions (ppm) | Strength ratio* (times) | Initial discharge capacity (mAH) | Discharge capacity after 400th cycle (mAH) | Capacity retention rate (%) |
|---|---|---|---|---|---|---|---|
| H | Material H | 4.0 | 6, 13 | 0.5 | 1091 | 872 | 80 |
| | | 4.05 | 3, 13 | 0.7 | 1702 | 1327 | 78 |
| | | 4.1 | −4, 13 | 1 | 1931 | 1467 | 76 |
| | | 4.15 | −5, 13 | 8 | 1945 | 1458 | 75 |
| | | 4.18 | −10, 13 | 13 | 1958 | 1370 | 70 |
| | | 4.2 | −12, 13 | 15 | 1968 | 413 | 21 |
| I | Material I | 4.0 | 8, 13 | 0.5 | 1059 | 857 | 81 |
| | | 4.05 | 4, 13 | 0.8 | 1677 | 1308 | 78 |
| | | 4.1 | −4, 13 | 2.1 | 1911 | 1433 | 75 |
| | | 4.15 | −6, 13 | 10 | 1924 | 1404 | 73 |
| | | 4.18 | −10, 13 | 12 | 1935 | 1354 | 70 |
| | | 4.2 | −12, 13 | 15 | 1940 | 465 | 24 |
| J | Material J | 4.0 | 7, 13 | 0.5 | 1069 | 855 | 80 |
| | | 4.05 | 3, 13 | 0.65 | 1546 | 1221 | 79 |
| | | 4.1 | −4, 13 | 1 | 1926 | 1502 | 78 |
| | | 4.15 | −5, 13 | 10 | 1973 | 1499 | 76 |
| | | 4.18 | −10, 13 | 12 | 1974 | 1381 | 70 |
| | | 4.2 | −12, 13 | 15 | 1985 | 476 | 24 |
| K | Material K | 4.0 | 7, 13 | 0.5 | 1069 | 855 | 80 |
| | | 4.05 | 3, 13 | 0.8 | 1578 | 1230 | 78 |
| | | 4.1 | −4, 13 | 1 | 1918 | 1476 | 77 |
| | | 4.15 | −4, 13 | 10 | 1932 | 1449 | 75 |
| | | 4.18 | −10, 13 | 12 | 1944 | 1360 | 70 |
| | | 4.2 | −12, 13 | 13 | 1969 | 433 | 22 |
| L | Material L | 4.0 | 8, 13 | 0.5 | 1066 | 863 | 81 |
| | | 4.05 | 4, 13 | 0.8 | 1769 | 1379 | 78 |
| | | 4.1 | −4, 13 | 1 | 1921 | 1459 | 76 |
| | | 4.15 | −5, 13 | 8 | 1943 | 1457 | 75 |
| | | 4.18 | −9, 13 | 11 | 1966 | 1395 | 71 |
| | | 4.2 | −11, 13 | 15 | 1989 | 576 | 29 |
| M | Material M | 4.0 | 8, 13 | 0.5 | 1021 | 816 | 80 |
| | | 4.05 | 2, 13 | 0.7 | 1682 | 1328 | 79 |
| | | 4.1 | −3, 13 | 1 | 1902 | 1483 | 78 |
| | | 4.15 | −6, 13 | 10 | 1923 | 1461 | 76 |
| | | 4.18 | −10, 13 | 11 | 1945 | 1361 | 70 |
| | | 4.2 | −12, 13 | 15 | 1981 | 455 | 23 |
| N | Material N | 4.0 | 8, 13 | 0.5 | 1039 | 851 | 82 |
| | | 4.05 | 4, 13 | 0.8 | 1508 | 1176 | 78 |
| | | 4.1 | −4, 13 | 1 | 1764 | 1358 | 77 |
| | | 4.15 | −5, 13 | 9 | 1789 | 1341 | 75 |
| | | 4.18 | −10, 13 | 12 | 1809 | 1266 | 70 |
| | | 4.2 | −12, 13 | 13 | 1817 | 363 | 20 |
| O | Material O | 4.0 | 8, 13 | 0.5 | 1039 | 808 | 80 |
| | | 4.05 | 4, 13 | 0.8 | 1510 | 1177 | 78 |
| | | 4.1 | −4, 13 | 1 | 1751 | 1348 | 77 |
| | | 4.15 | −6, 13 | 10 | 1810 | 1357 | 75 |
| | | 4.18 | −10, 13 | 11 | 1815 | 1270 | 70 |
| | | 4.2 | −12, 13 | 12 | 1828 | 530 | 29 |
| P | Material P | 4.0 | 8, 13 | 0.5 | 1002 | 801 | 80 |
| | | 4.05 | 3, 13 | 0.8 | 1474 | 1149 | 78 |
| | | 4.1 | −4, 13 | 1.5 | 1692 | 1302 | 77 |
| | | 4.15 | −7, 13 | 10 | 1755 | 1316 | 75 |
| | | 4.18 | −10, 13 | 12 | 1799 | 1259 | 70 |
| | | 4.2 | −12, 13 | 15 | 1805 | 415 | 23 |
| Q | Material Q | 4.0 | 6, 13 | 0.5 | 1099 | 868 | 79 |
| | | 4.05 | 4, 13 | 0.8 | 1508 | 1176 | 78 |
| | | 4.1 | −4, 13 | 1 | 1719 | 1323 | 77 |
| | | 4.15 | −5, 13 | 10 | 1755 | 1333 | 76 |
| | | 4.18 | −10, 13 | 12 | 1800 | 1260 | 70 |
| | | 4.2 | −12, 13 | 15 | 1805 | 541 | 30 |
| R | Material R | 4.0 | 8, 13 | 0.5 | 1092 | 862 | 79 |
| | | 4.05 | 3, 13 | 0.8 | 1445 | 1141 | 78 |
| | | 4.1 | −4, 13 | 1.2 | 1754 | 1350 | 77 |
| | | 4.15 | −6, 13 | 10 | 1800 | 1368 | 76 |
| | | 4.18 | −10, 13 | 12 | 1805 | 1281 | 71 |
| | | 4.2 | −12, 13 | 14 | 1810 | 325 | 18 |
| S | Material S | 4.0 | 8, 13 | 0.5 | 1098 | 878 | 80 |
| | | 4.05 | 4, 13 | 0.7 | 1455 | 1134 | 78 |
| | | 4.1 | −4, 13 | 1 | 1710 | 1316 | 77 |
| | | 4.15 | −8, 13 | 10 | 1745 | 1308 | 75 |
| | | 4.18 | −10, 13 | 12 | 1795 | 1256 | 70 |
| | | 4.2 | −12, 13 | 15 | 1809 | 434 | 24 |
| T | Graphite | 4.2 | — | — | 1510 | 906 | 60 |

What is claimed is:

1. A non-aqueous electrolyte secondary battery having a non-aqueous electrolyte, separator, and positive and negative electrodes capable of intercalating and de-intercalating lithium, said negative electrode including composite particles including at least one element selected from tin, silicon, and zinc as a constituent element thereof and at least one of:

(a) a solid solution of said constituent element and at least one element selected from groups consisting of Group 2 elements, transition elements, Group 12, Group 13, and Group 14 elements in a Periodic Table except for said constituent element and carbon; and (b) an inter-metallic compound of said constituent element and at least one element selected from groups consisting of Group 2 elements, transition elements, Group 12, Group 13, and Group 14 elements in the Periodic Table except for said constituent element and carbon, covering said particles entirely or partly, said electrode material includes an amount of lithium which produces a plurality of NMR signals between −10 to 40 ppm with at least one signal between −10 to 4 with respect to a reference of lithium chloride.

2. A non-aqueous electrolyte secondary battery of claim 1 wherein a signal strength of said NMR signals appearing within the range of −10 to 4 ppm are 1 to 10 times of a NMR signal strength appearing within the range of 10 to 20 ppm.

* * * * *

UNITED STATES PATENT AND TRADEMARK OFFICE
CERTIFICATE OF CORRECTION

PATENT NO. : 6,653,019 B1
DATED : November 25, 2003
INVENTOR(S) : Shimamura et al.

It is certified that error appears in the above-identified patent and that said Letters Patent is hereby corrected as shown below:

<u>Title page,</u>
Item [56], References Cited, please insert:
-- FOREIGN PATENT DOCUMENTS
JP    10-509683    9/1998
JP    55-136131    10/1980 --

Signed and Sealed this

Twentieth Day of July, 2004

JON W. DUDAS
*Acting Director of the United States Patent and Trademark Office*